Nov. 19, 1946.   L. M. McBRIDE   2,411,165
CLINOMETER
Filed Sept. 16, 1943   2 Sheets-Sheet 1
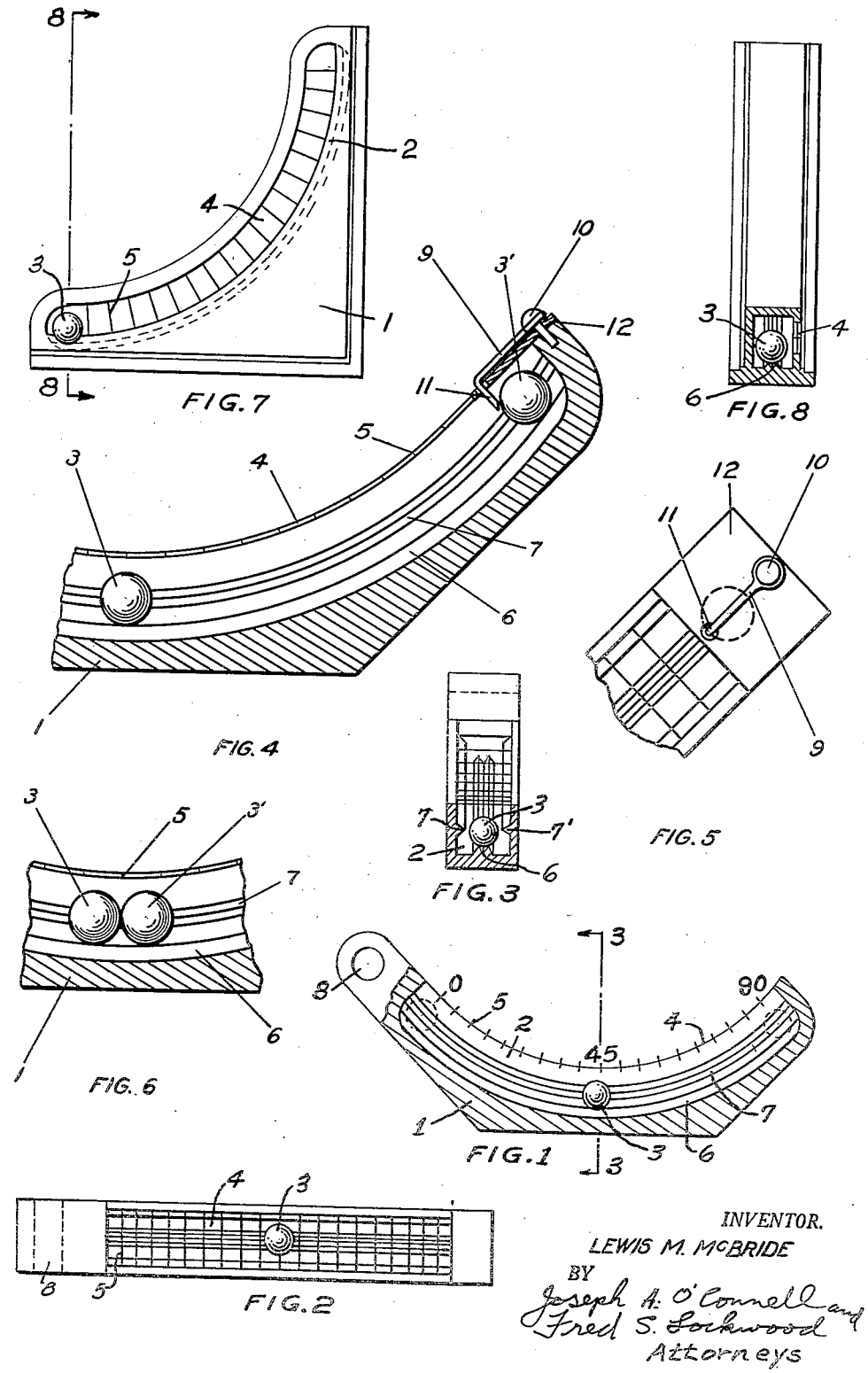
INVENTOR.
LEWIS M. McBRIDE Nov. 19, 1946.        L. M. McBRIDE         2,411,165
                        CLINOMETER
            Filed Sept. 16, 1943      2 Sheets-Sheet 2

INVENTOR.
LEWIS M. McBRIDE
BY
Joseph A. O'Connell
Fred S. Lockwood
Attorneys

Patented Nov. 19, 1946

2,411,165

UNITED STATES PATENT OFFICE 2,411,165

CLINOMETER

Lewis M. McBride, United States Army

Application September 16, 1943, Serial No. 502,588

2 Claims. (Cl. 33—206)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to devices for measuring angles or inclinations, commonly referred to as clinometers, and an object of this invention is to provide a clinometer which may be used to advantage on a mortar, gun, tank, vehicle, boat, machine or machine part, or on other equipment, particularly where the use of an expensive, delicate or fragile instrument is impracticable.

A further object of the invention is to provide a small, compact form of clinometer capable of indicating angles or inclinations automatically without requiring the manual setting of a scale or indicator.

Still another object of the invention is to provide a clinometer having a minimum of oscillation as regards the movable or indicating element when the angle of elevation or inclination is changed, or when the instrument is subjected to severe shock or jar; the invention contemplating means whereby the indicating element, under conditions just stated, will be damped so as to come to rest at the proper reading in a minimum of time. Clinometers and similar devices heretofore designed and used usually contained a fragile, spirit-level-tube of glass that is subject to breakage when the instrument is used on equipment subject to severe shock or when the instrument is otherwise exposed to rough handling. Instruments of this general character have been designed and used which employ a form of pendulum instead of a level-tube. However, this pendulum-equipped form of instrument necessitates, from the standpoint of construction, a frame to support the pendulum, the height of the frame being directly proportional to the length of the pendulum, and the width of the frame being directly proportional to the length of arc desired on the scale to be read. Consequently, as is readily apparent, such instruments are objectionable because they are necessarily large and cumbersome.

The level-tube type of clinometer, above referred to, is also objectionable in that such is usually constructed with two or more moving parts that are manually adjusted or set with relation to each other at the desired angle. Hence, an objectionable feature of this type of instrument is the requiring of an adjustment and setting for each angle or inclination measured or required.

To overcome the disadvantages above noted with respect to prior forms of clinometers, and the provision of an instrument which will possess all the attributes required of a clinometer when used in the manner and under the circumstances contemplated by this invention, constitute the primary objects of this invention.

The invention, together with the objects as herein enumerated and others as will present themselves as the description proceeds, will be best understood and appreciated from a study of the following description, taken in connection with the accompanying drawings wherein:

Figure 1 is a side view of one form of clinometer embodying the features of this invention, and with certain parts shown in elevation and other parts broken away and shown in section.

Figure 2 is a top-plan view of the clinometer.

Figure 3 is a sectional view taken substantially on the line 3—3 of Figure 1.

Figure 4 is a fragmentary, longitudinal sectional view through a modified form of clinometer embodying the features of this invention.

Figure 5 is a fragmentary, top-plan view of the form of clinometer shown in Figure 4.

Figure 6 is a fragmentary, longitudinal sectional view through the form of clinometer of Figure 4.

Figure 7 is a side elevational view of a third form of clinometer.

Figure 8 is a detail sectional view taken substantially on the line 8—8 of Figure 7.

Figure 9:
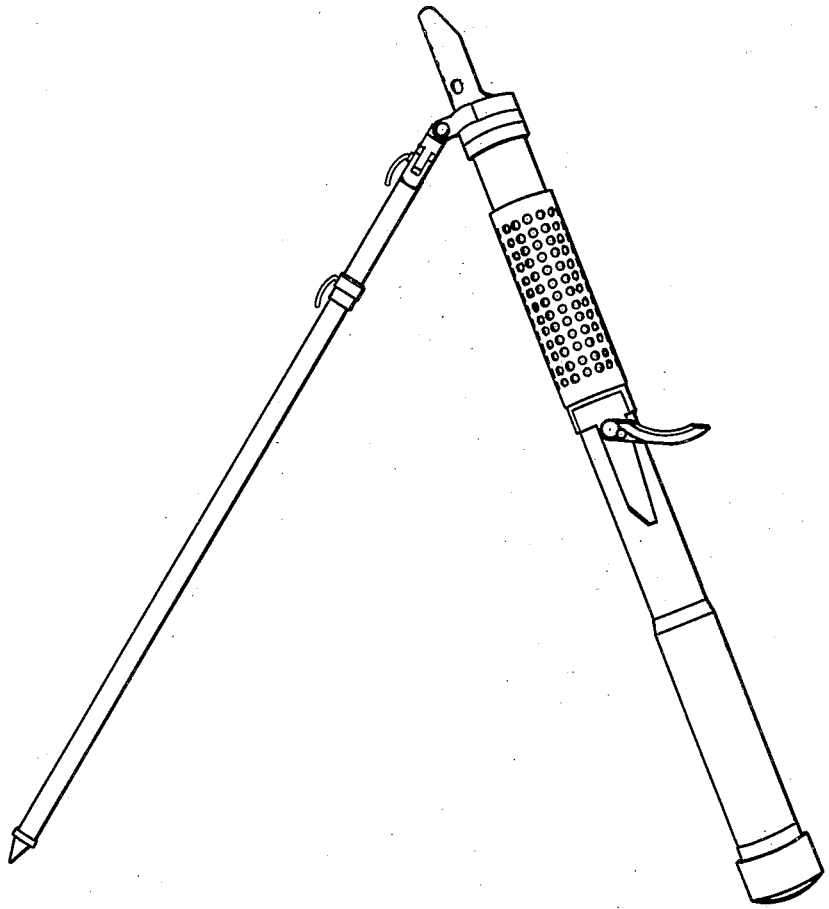
Figure 9 is a view illustrating the use of the clinometer of this invention on a hand mortar, with the latter being illustrated as set up for use.

In the forms of the invention illustrated in Figures 1 to 6 inclusive, the clinometer embodies a body 1 formed of metal, plastic or other suitable material, and provided with an arcuate slot or runway 2 of any suitable radius. Slot or runway 2 is protected against the entrance of dust, dirt, water and other foreign matter through the medium of a suitable transparent cover plate 4 upon which is suitably provided a scale 5 graduated in degrees, mils or any other desired system according to the proposed use of the device. On the bottom of the slot or runway 2 is formed a pair of sharp-edged or knife-blade ridges or tracks 6.

In the form of the invention shown in Figures 1 to 3 inclusive, a single movable index, in the form of a ball 3, is movably confined within the slot or runway 2. Also in this form of the invention there are formed on the opposed side walls of the slot or runway 2 sharp-edged guide rails 7—7'.

By providing the tracks 6 upon which ball 3 rolls, the latter will roll freely with a minimum of friction. The lateral guides 7—7' provide for smooth rolling of the ball 3, even though the instrument be canted or tilted to either side.

It is obvious that in using the device, the angle or inclination measured can be readily determined by reading the ball 3 against the graduations of scale 5.

In the form of the invention illustrated in Figures 4 to 6 inclusive, the manner of using two index balls 3—3' is illustrated. Where two such balls are used, the clinometer is equipped at one end thereof with a retaining spring 9 secured to the body 1 at one end by a suitable fastener 10. At the free end thereof spring 9 is provided with an integral keeper 11 formed by bending said end of the spring at substantially right angles thereto. The keeper 11 works through a slot provided therefor in wall 4, and a slot aligning with the first-named slot and formed in cover plate 12 provided as shown.

As shown in Figure 4, the spring-biased keeper 11 serves to releasably secure ball 3' in one end of the slot or runway 2 and at a sufficient distance beyond the end limit of scale 5 so as not to interfere with ball 3 when the latter is used alone, and also to permit reading at the end limit of the scale when both balls 3—3' are used.

Manifestly, ball 3' may be placed in or out of action at will by means of the spring 9 and associated keeper 11. By lifting the free end of the spring 9, keeper 11 is retracted for releasing the ball 3'. To return the ball 3' out of action, it is only necessary to lift the free end of the spring 9 and rotate the instrument bodily so that the ball 3 rolls into the proper end of runway 2 to be retained at that position upon release of spring 9.

In connection with the invention as thus far described, it will be apparent that when a single ball is used and the angle of the instrument is changed suddenly or rapidly, the ball tends to oscillate for a short time before coming to rest. When using the form of the invention shown in Figures 4 to 6, and if because of the particular use of the device the delay due to oscillation is objectionable, the second ball 3' may be brought into use as hereinbefore set forth, whereby the friction between ball contacts, and also the opposing direction of rotation of ball surfaces in contact, reduces the oscillation and both balls come to rest promptly. As is manifest, when the two balls 3—3' are used, the angle or inclination is determined by reading the graduations of scale 5 against the point of contact between the balls.

In the form of the invention shown in Figures 7 and 8, the body 1 is illustrated as having two bases at right angles and tangent to the arcuate runway for convenient use by machinists, engineers, carpenters, constructors and the like or as a gunner's quadrant. Also, in this form of the invention the runway 2 opens laterally of the body, and the open side of the runway is provided with a transparent wall 4 corresponding to wall 4 of the previously described alternate forms of the invention. The wall 4 of this third form of the invention is also provided with a graduated scale, the graduations of which are read against the index or ball 3 in an obvious manner. In this connection it will, of course, be understood that two balls may be used in this form of the invention by modifying this form of the invention in accordance with the teachings of the form of the invention disclosed in Figures 4 to 6.

It will also be noted that in respect to this third form of the invention, side guides corresponding to the previously described side guides 7—7' are dispensed with.

Figure 10:
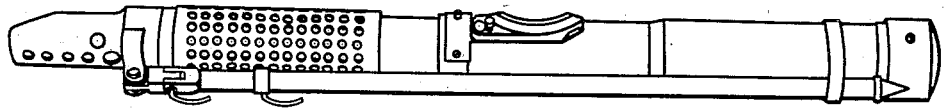
Figure 10 is an elevational view illustrating the position of the clinometer on the hand mortar when the latter is in a "carry" position.

To facilitate mounting the clinometer of this invention on the work, such as, for example, a hand mortar as shown in Figures 9 and 10, the body 1 of the clinometer, as illustrated in Figures 1 and 2 is provided at one end thereof with a transverse opening 8 to accommodate a pivot bolt or other suitable fastening element.

With the clinometer mounted on a hand mortar as shown in Figures 9 and 10, it will be seen, from a study of Figure 9, that when the mortar is set up for use, the clinometer may be swung outwardly to the operating position shown in said figure.

When the mortar is in the "carry" position shown in Figure 10, the clinometer is swung from the position shown in Figure 9 to the position shown in Figure 10, and in the latter position will in no wise interfere with the carrying or otherwise proper handling of the mortar.

While there has been herein illustrated and described what is considered the preferred embodiments of the invention, it will be understood that it is in no wise intended to restrict the invention beyond the requirements of the prior art and scope of the claims hereunto appended.

Having thus described the invention, what is claimed as new is:

1. A clinometer comprising means providing a closed runway having a transparent wall, a scale on said wall, and a pair of rolling members confined within the runway and adapted to roll therein by action of gravity upon inclination of the runway lengthwise, said rolling members being adapted to be read against the graduations of said scale and co-acting by reason of frictional contact between the surfaces thereof and the opposing rotation of the rolling members while in surface contact, to produce a damping action on the respective rolling members whereby oscillation is reduced and the rolling members come to a prompt position of rest when the clinometer is in a position of rest, and means at one end of said runway for releasably securing a selected one of said rolling members against rolling therein by the action of gravity upon inclination of the runway.

2. A clinometer comprising means providing a closed runway having a transparent wall, a scale on said wall, a pair of rolling members confined within the runway and adapted to roll therein by action of gravity upon inclination of the runway lengthwise, said rolling members being adapted to be read against the graduations of said scale and co-acting by reason of frictional contact between the surfaces thereof and the opposing rotation of the rolling members while in surface contact, to produce a damping action on the respective rolling members whereby oscillation is reduced and the rolling members come to a prompt position of rest when the clinometer is in a position of rest, and a spring-biased keeper mounted at one end of said runway for releasably retaining one of said rolling members in substantially a position of rest at said one end of the runway.

LEWIS M. McBRIDE.